Patented Sept. 17, 1940

2,215,383

UNITED STATES PATENT OFFICE 2,215,383

PROCESS AND PRODUCT FOR SOFTENING RUBBER

Arthur E. Warner, Akron, Ohio, assignor to The C. P. Hall Company, Akron, Ohio, a corporation of Ohio No Drawing. Application June 30, 1936,
Serial No. 88,188

6 Claims. (Cl. 260—761)

This invention relates to an improved process for softening rubber and to novel softening agents for use in carrying out the process. More particularly the invention relates to the softening of crude rubber prior to the milling thereof.

The preparation and vulcanization of rubber stock are two of the major items involved in the manufacture of rubber products. In preparing such stock it is, of course, customary to mill the rubber to render it more plastic, and it is common practice to incorporate certain softening agents with the rubber, which agents enable the stock to be more readily worked, and which assist in the subsequent molding and curing operations. A number of such agents have been employed, particularly for incorporation in the rubber during the milling thereof whereby the pressure from the mill rolls may be utilized to assist in forcing the agent into the rubber, but all of the softening agents known to me prior to my discovery have certain short-comings. For example, either their plasticising effect is of low order, or they are poor dispersing agents, or they fail properly to penetrate and combine with the rubber. Accordingly, it is an object of this invention to provide softening agents which will overcome the disadvantages referred to and another object is to improve the process for treating rubber by incorporating my agents therein. Moreover, since it is unsatisfactory in most rubber factories to incorporate the softening agent in the rubber for the first time at the mill, such factories are desirous of obtaining softening agents which can be readily soaked up by a batch of rubber, termed a master batch or non-productive, whereby a predetermined amount of the non-productive can be incorporated into crude rubber during milling thereof, thereby eliminating the disadvantages which occur when the softening agent is added for the first time during the milling operation. It is, therefore, a further object of this invention to provide a rubber softening agent an appreciable amount of which can be absorbed by the rubber by immersing the latter in the agent.

Other objects and advantages will become apparent from the following description.

I have discovered that certain bituminous materials, viz., certain wood tar products, certain coal tar products and certain asphalts, when combined with suitable petroleum products, produce improved rubber softening agents which have excellent dispersion qualities, their plasticising effect is very high, they will readily combine with and penetrate rubber at elevated temperatures, and they do not require preheating. The bituminous materials are relatively inexpensive and are valuable because of their very excellent dispersion qualities and their neutrality toward accelerators, antioxidants, etc., but they lack the ability per se properly to penetrate the rubber. However, since the petroleum products, in addition to having good dispersion qualities and neutrality toward accelerators, antioxidants, etc., also have the ability to carry the bituminous materials into the rubber, such petroleum products can be properly called activators of penetration, and when combined in solution with the bituminous materials, a superior rubber softening agent is obtained.

As an example of my softening agents, I take a wood tar product, such as would be obtained in the destructive distillation of wood, preferably having a viscosity of from 2 to 12, Engler, at 212° F., and a specific gravity of from 1.00 to 1.12. Preferably, but not necessarily, the wood tar product also should have a volatile content not to exceed 3% when heated five hours at a temperature of 325° F. in an open container under conventional laboratory procedure. With this product I preferably incorporate a petroleum product having a distillation range of from 300° F. to 725° F., and a specific gravity of from .83 to .90. Absorbent petroleum oils and Diesel fuel oils having distillation and specific gravity ranges as aforesaid are examples of suitable petroleum products which may be used. Preferably I add approximately 20 parts by weight of the oil to 100 parts by weight of the wood tar product, these ingredients being readily soluble and forming a solution which is a very excellent rubber softening agent.

Example 2.—Instead of a wood tar product, I can also use a coal tar product, such as would be obtained in the destructive distillation of coal, having a viscosity, a specific gravity and a volatile content within the ranges given for the wood tar product, and add to 100 parts by weight of such coal tar product, approximately 20 parts by weight of the petroleum products referred to.

Example 3.—In place of the tar products, I can also use an asphalt, preferably such as would be obtainable in the still residues from oil cracking stills, having a viscosity, a specific gravity and a volatile content within the ranges given in the previous examples. To 100 parts by weight of this asphalt I preferably add approximately 20 parts by weight of the petroleum products previously referred to.

Example 4.—It is also possible to combine some of the asphalt of the kind referred to and either a wood tar or coal tar product or both of the kind specified, and add thereto the petroleum products referred to. The proportions preferably are 50 parts by weight of an asphalt and 50 parts by weight of a tar product added to 20 parts by weight of said petroleum product.

When I refer to 20 parts by weight of oil to be added to the tar products or the asphalt or both I do not desire to be limited to such proportion, since I have found that the addition of as much as 40 parts and as little as 10 parts by weight of the oil produces a good softener, but the results are not as satisfactory as when approximately 20 parts are added. Hence the latter proportion is preferred.

In carrying out my improved process, I take washed, undried, crude rubber and immerse same in any of my softening agents at a temperature substantially above the boiling point of water for usually less than 10 minutes. The high temperature drives off practically all of the water content and the rubber will readily absorb from 35% to 40% of the agent to its own weight. This amount of softening agent usually makes the rubber too soft for use as a whole and accordingly this rubber is known as a master batch from which any desired quantity is obtained for subsequent incorporation with crude rubber stock which has not been subjected to the action of the softening agent. Obviously the amount of rubber taken from the master batch in each instance for incorporation with the crude stock will depend upon the purpose for which the final rubber product is to be used.

As before stated my improved softening agents have excellent dispersion qualities and readily penetrate and combine with the rubber with no harmful effect to the rubber or to any of the ingredients incorporated therein such as accelerators, antioxidants, etc.

It will be apparent that modifications of the invention may be resorted to without departing from the spirit thereof or from the scope of the subjoined claims.

What is claimed is:

1. A rubber softening agent for absorption by rubber prior to milling comprising a bituminous material having a viscosity between 2 and 12, Engler, at 212° F. and a specific gravity between 1.00 and 1.12, and a petroleum product having distillation ranges of from 300° F. to 725° F. and a specific gravity of from .83 to .90, in which the petroleum product serves as an activator of penetration for the bituminous material.

2. A rubber softening agent for absorption by rubber prior to milling comprising bituminous material selected from the group consisting of a wood tar product, a coal tar product and an asphalt, and a petroleum product having a distillation range of from 300° F. to 725° F. and a specific gravity of from .83 to .90, in which the petroleum product serves as an activator of penetration for the bituminous material.

3. The method of treating coagulated rubber and the like which comprises incorporating therein prior to milling a solution comprising about 100 parts by weight of a bituminous material and approximately 10 to 40 parts by weight of a petroleum product having a distillation range of from 300° F. to 725° F. and a specific gravity of from .83 to .90, said petroleum product serving as an activator of penetration for the bituminous material.

4. The method of treating coagulated rubber and the like which comprises incorporating therein prior to milling a solution of a bituminous material selected from the group consisting of a wood tar product, a coal tar product and an asphalt, and a petroleum product having a distillation range of from 300° F. to 725° F. and a specific gravity of from .83 to .90, said petroleum product serving as an activator of penetration for the bituminous material.

5. A composition comprising coagulated rubber and the like and a softening agent comprising about 100 parts by weight of a bituminous material and approximately 10 to 40 parts by weight of a petroleum product having a distillation range of from 300° F. to 725° F. and a specific gravity of from .83 to .90, in which the petroleum product served as an activation of penetration for the bituminous material.

6. A composition comprising coagulated rubber and the like and a softening agent comprising a bituminous material selected from the group consisting of a wood tar product, a coal tar product and an asphalt, each having a viscosity of between 2 and 12, Engler, at 212° F., a specific gravity between 1.00 and 1.12 and a volatile content not to exceed 3% at 325° F., and a petroleum product having a distillation range of from 300° F. to 725° F., and a specific gravity of from .83 to .90, in which the petroleum product served as an activation of penetration for the bituminous material.

ARTHUR E. WARNER.